(12) United States Patent
Ramsden et al.

(10) Patent No.: US 10,310,102 B2
(45) Date of Patent: Jun. 4, 2019

(54) GAMMA-RAY DETECTOR

(71) Applicant: Symetrica Limited, Southhampton Hampshire (GB)

(72) Inventors: David Ramsden, Southhampton (GB); Mark Abbott Foster, Southhampton (GB)

(73) Assignee: Symetrica Limited, Southampton (GB)

( * ) Notice: Subject to any disclaimer, the term of this patent is extended or adjusted under 35 U.S.C. 154(b) by 105 days.

(21) Appl. No.: 15/100,771

(22) PCT Filed: Nov. 28, 2014

(86) PCT No.: PCT/GB2014/053526
§ 371 (c)(1),
(2) Date: Jun. 1, 2016

(87) PCT Pub. No.: WO2015/082881
PCT Pub. Date: Jun. 11, 2015

(65) Prior Publication Data
US 2016/0306052 A1   Oct. 20, 2016

(30) Foreign Application Priority Data
Dec. 2, 2013 (GB) .................................. 1321190.9

(51) Int. Cl.
*G01T 1/20*    (2006.01)
*G01T 1/169*   (2006.01)

(52) U.S. Cl.
CPC ............ *G01T 1/2006* (2013.01); *G01T 1/169* (2013.01)

(58) Field of Classification Search
CPC .............................. G01T 1/2006; G01T 1/169
See application file for complete search history.

(56) References Cited

U.S. PATENT DOCUMENTS 2,830,187 A     4/1958   Scherbatskoy
5,694,933 A  *  12/1997  Madden ............... A61B 6/4057
                                                    250/363.02
(Continued)

FOREIGN PATENT DOCUMENTS

CA    2 516 817 A1    2/2007
EP    1 956 392 A1    8/2008
(Continued)

*Primary Examiner* — Christine S. Kim
(74) *Attorney, Agent, or Firm* — Fitzsimmons IP Law

(57) ABSTRACT

A gamma-ray detector for determining the direction to a source of gamma-rays is described. The detector comprises a first scintillation body coupled to a first photodetector and a second scintillation body coupled to a second photodetector, wherein the first scintillation body and the second scintillation body are arranged to be co-axial with a pointing axis of the detector. The detector further comprises a processing circuit arranged to receive output signals associated with the first and second photodetectors for a plurality of different orientations of the pointing axis of the detector relative to a reference direction. The processing circuit is further operable to determine a direction to the source of gamma-rays relative to the reference direction based on output signals associated with the first and second photodetectors for the plurality of different orientations of the pointing axis of the detector relative to the reference direction.

17 Claims, 5 Drawing Sheets

(56) References Cited

U.S. PATENT DOCUMENTS

| | | | | |
|---|---|---|---|---|
| 6,643,538 | B1* | 11/2003 | Majewski | A61B 1/042 348/162 |
| 8,319,188 | B2* | 11/2012 | Ramsden | G01T 1/1644 250/370.09 |
| 2003/0111611 | A1* | 6/2003 | Maublant | G01T 1/161 250/366 |
| 2005/0121618 | A1* | 6/2005 | Fowler, Jr. | G01T 1/169 250/394 |
| 2005/0263711 | A1* | 12/2005 | Gerl | G01T 1/169 250/393 |
| 2006/0106306 | A1* | 5/2006 | Essner | A61B 8/0833 600/436 |
| 2008/0048123 | A1* | 2/2008 | Larsson | G01T 1/169 250/363.01 |
| 2009/0309032 | A1* | 12/2009 | Ramsden | G01T 1/1644 250/370.1 |
| 2011/0196234 | A1* | 8/2011 | Buono | G01T 1/161 600/436 |
| 2011/0303854 | A1* | 12/2011 | DeVito | G01T 7/00 250/394 |
| 2014/0346337 | A1* | 11/2014 | Huiszoon | G01V 5/08 250/265 |

FOREIGN PATENT DOCUMENTS

| | | |
|---|---|---|
| EP | 2 075 595 A3 | 9/2012 |
| GB | 2 440 588 A | 2/2008 |
| WO | WO 02/31536 A | 4/2002 |
| WO | WO 2008/015382 | 2/2008 |
| WO | WO 2011/107930 A1 | 9/2011 |

\* cited by examiner

GAMMA-RAY DETECTOR

BACKGROUND ART

The invention relates to gamma-ray detection, and in particular to gamma-ray detection for determining the direction to a source of gamma-rays.

There are a number of situations in which there is a desire to be able to determine the characteristics of gamma-ray radiation in an environment. Such characteristics might include the intensity of radiation in the environment, the nature of the radioisotope(s) producing the radiation, and the direction from which the radiation is coming. For example, this information can be of great benefit to emergency staff entering a 'disorganised' nuclear environment, for screening personnel and cargo in order to police the illicit trafficking of radioactive materials, and for general searching for 'orphaned' sources of radiation.

Gamma-ray detectors with the ability to measure the intensity of radiation in an environment and to identify the nature of the source emitting the radiation (from spectroscopic information) are generally available, for example the GR-135 Exploranium® instrument from the SAIC Corporation, the Indentifinder-2 from Flir Systems Inc., and the Radseeker® instrument from Smiths Detection Inc. However, to determine the direction to the source using these detectors the user must rely on dose-rate trends. This is done by moving the detector and noting how the measured intensity changes. An increase in measured intensity indicates the motion is towards the source. A decrease in measured radiation indicates the motion is away from the source. The location of the source may thus be found by trial and error as a user wanders about in the environment. A problem with this approach is than it can be slow and unreliable.

There have also been proposed gamma-ray detectors with direction finding capabilities that are not reliant on dose trending.

One example gamma-ray detector with direction finding capability is described by Larsen et al [1]. In this device the functions of gamma-ray spectrometry for determining the nature of radioactive isotopes and gamma-ray direction finding are performed independently. A small LaBr3 crystal spectrometer is used to identify the nature of the source whilst the direction towards the source is determined using four Geiger counters. These are located in the four corners of a lead collimator that takes the form of a cross. The count-rates from these four Geiger counters can be used to provide information on the direction towards the source.

Another example gamma-ray detector with direction finding capability is described in WO 2008/015382 [2]. This example uses four scintillation crystals closely-packed around a pointing axis for the detector. When detector signals from the four scintillation crystals are equal the pointing axis of the device is assumed to be aligned with a direction to the source of radiation.

Another example gamma-ray detector with direction finding capability is described by Wahl and He [3]. With this example detector directional information on the source of gamma radiation can be provided using information provided by recording multiple Compton-scatter events in a material such as CdZnTe single crystals. The detector provides information on the energy and location of energy deposits produced by Compton electrons. The kinematics of Compton interactions means a single gamma-ray event can produce an annular ring response. By observing multiple events, a series of intersecting rings may be generated. A most-probable direction to the source of the events may then be derived based on where there is the highest number of intersections among the rings.

Whilst the known approaches for determining directions to sources of gamma-ray radiation can provide useful results, there are some drawbacks associated with the various approaches, for example in terms of device size and complexity.

Accordingly, there remains a need for new designs for radiation detectors that allow the direction from which radiation is coming to be determined, for example using simple hand-held instruments or potentially larger, vehicle mounted detector systems.

SUMMARY OF THE INVENTION

According to a first aspect of the invention there is provided a gamma-ray detector for determining the direction to a source of gamma-rays, the detector comprising: a first scintillation body coupled to a first photodetector and a second scintillation body coupled to a second photodetector, wherein the first scintillation body and the second scintillation body are arranged to be co-axial on a pointing axis of the detector; and a processing circuit arranged to receive output signals associated with the first and second photodetectors for a plurality of different orientations of the pointing axis of the detector relative to a reference direction, and wherein the processing circuit is operable to determining a direction to the source of gamma-rays relative to the reference direction based on the output signals associated with the first and second photodetectors for the plurality of different orientations of the pointing axis of the detector relative to the reference direction.

In accordance with some examples the processing circuit is operable to establish a signal parameter for each orientation of the pointing axis of the detector from the respective output signals associated with the first and second photodetectors for the respective orientations.

In accordance with some examples the processing circuit is operable to determine the direction to the source of gamma-rays relative to the reference direction by comparing the signal parameter for the plurality of different orientations of the pointing axis with a predetermined model of the variation of the signal parameter for different orientations of the pointing axis relative to a source of gamma-rays.

In accordance with some examples the processing circuit is operable to estimate the energies for gamma-rays from the gamma-ray source based on the output signals associated with the photodetectors and wherein the predetermined model is determined by taking account of the estimated energies for gamma-rays from the gamma-ray source.

In accordance with some examples the signal parameter established for each orientation of the pointing axis of the detector is based on the relative output signals associated with the first and second photodetectors.

In accordance with some examples the signal parameter established for each orientation of the pointing axis of the detector is based on a ratio of a difference in output signals associated with the first and second photodetectors to a sum of output signals associated with the first and second photodetectors.

In accordance with some examples the processing circuit is operable to take account of error estimates for the output signals associated with the different photodetectors for the different orientations of the pointing axis of the detector when determining a direction to the source of gamma-rays.

In accordance with some examples the detector further comprises a sensor for determining the orientation of the pointing axis of the detector relative to the reference direction.

In accordance with some examples the detector further comprises a drive mechanism configured to move the pointing axis of the detector, and wherein the processing circuit is operable to control the drive mechanism to sequentially move the pointing axis of the detector to the different orientations of the pointing axis of the detector relative to a reference direction to obtain the output signals from which the direction to the source of gamma-rays is to be determined.

In accordance with some examples the detector further comprises an interface for providing instructions for a user of the detector to sequentially move the pointing axis of the detector to the different orientations of the pointing axis of the detector relative to a reference direction to obtain the output signals from which the direction to the source of gamma-rays is to be determined.

In accordance with some examples the processing circuit is further operable to provide an indication to the user when the pointing axis of the detector is at one of the different orientations of the pointing axis of the detector relative to a reference direction to obtain the output signals from which the direction to the source of gamma-rays is to be determined.

In accordance with some examples the processing circuit is operable to estimate the energies for gamma-rays from the gamma-ray source based on the output signals associated with the photodetectors and wherein the direction to the source of the gamma-rays is determined in a manner that takes account of the estimated energies for gamma-rays from the gamma-ray source.

In accordance with some examples the detector further comprises a calibration source comprising a radioactive material associated with the emission of positrons arranged between the first and second scintillation bodies, and wherein the processing circuit is configured to classify simultaneous output signals from the first and second photodetectors as being associated with 511 keV gamma-rays associated with the annihilation of a positron from the calibration source, and to adjust a gain associated with the respective photodetectors based on the respective output signals classified as being associated with 511 keV gamma-rays.

In accordance with some examples the processing circuit is further operable to output an indication of the determined direction towards the source of gamma-rays.

In accordance with some examples the plurality of different orientations of the pointing axis of the detector relative to the reference direction comprise three or more different orientations.

In accordance with some examples the plurality of different orientations lie substantially in a two-dimensional plane with the direction to the source of gamma-rays being determined as a direction within the two-dimensional plane.

In accordance with some examples the plurality of different orientations do not lie substantially in the same plane.

In accordance with some examples the processing circuit is operable to provide an indication of the intensity of the gamma-ray source based on the magnitudes of the output signals.

In accordance with some examples the processing circuit is operable to generate one or more energy loss spectra from the output signals.

In accordance with some examples the processing circuit is operable to perform a spectral analysis of the one or more energy loss spectra, and to identify the nature of the source based on the spectral analysis.

In accordance with some examples the first and second scintillation bodies are separated from one another by a layer of optically opaque material.

According to a second aspect of the invention there is provided a method of determining the direction to a source of gamma-rays using a detector comprising a first scintillation body coupled to a first photodetector and a second scintillation body coupled to a second photodetector, wherein the first scintillation body and the second scintillation body are arranged on a pointing axis of the detector; the method comprising obtaining output signals associated with the first and second photodetectors for a plurality of different orientations of the pointing axis of the detector relative to a reference direction, and determining a direction to the source of gamma-rays relative to the reference direction based on the output signals associated with the first and second photodetectors for the plurality of different orientations of the pointing axis of the detector relative to the reference direction.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
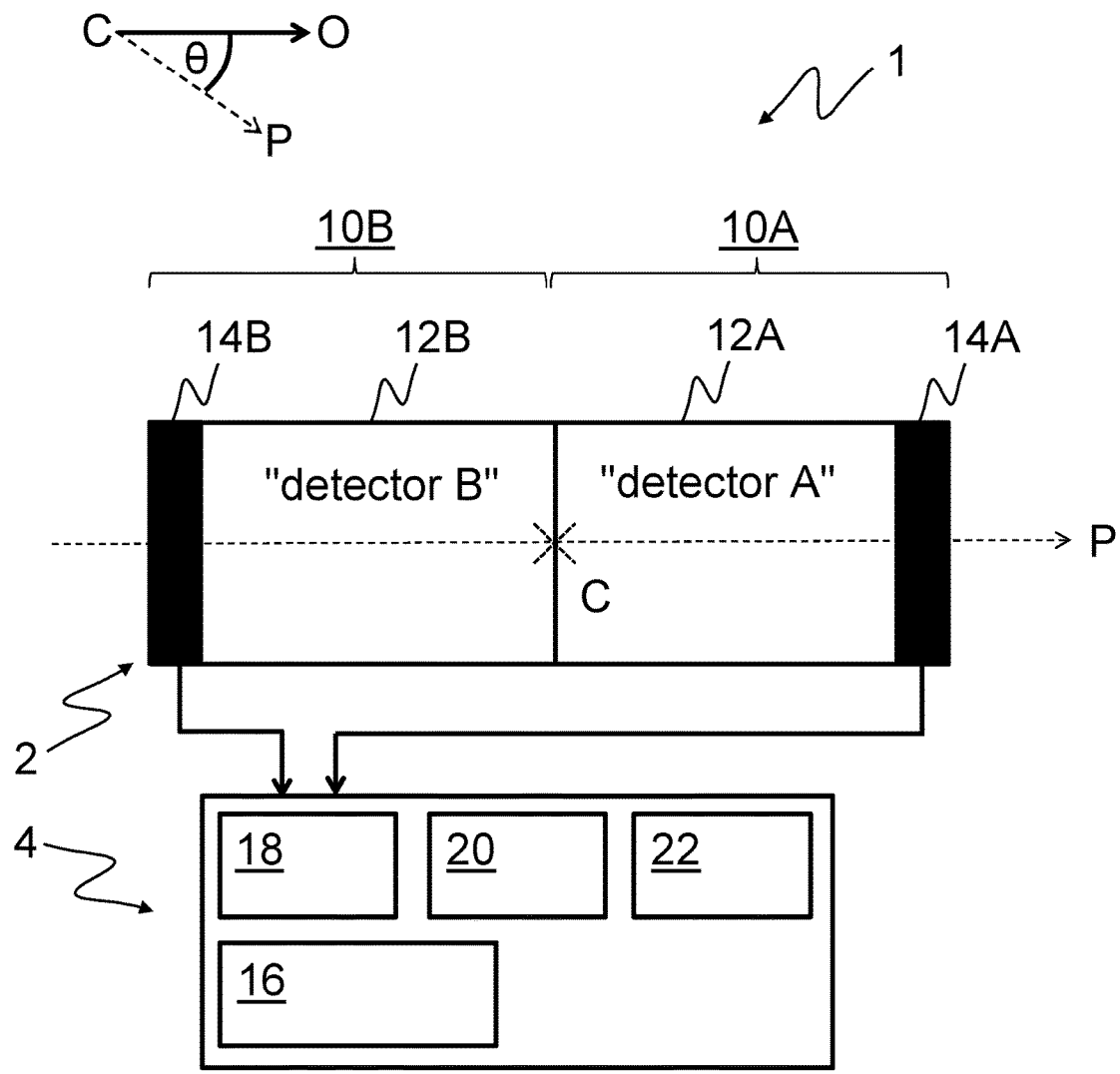
FIG. 1 schematically shows a gamma-ray detector for determining the direction to a source of gamma-rays according to an embodiment of the invention.

FIG. 1 schematically shows a gamma-ray detector 1 for determining the direction to a gamma-ray source according to an embodiment of the invention.

The detector 1 generally comprises a gamma-ray detector element 2 and a controller element 4.

The gamma-ray detector element 2 comprises a first scintillation detector 10A (which might sometimes be referred to simply as detector A) and a second scintillation detector 10B (which might sometimes be referred to simply as detector B). The two scintillation detectors 10A, 10B in this example are nominally identical and each comprise a conventional scintillation body 12A, 12B coupled to a respective conventional photodetector 14A, 14B. In this particular example embodiment the scintillation bodies are both Thallium-doped Caesium Iodide (CsI(Tl)) crystal scintillation bodies. The scintillation bodies 12A, 12B are arranged in line along a pointing axis P of the detector 1. In particular, the two scintillation bodies 12A, 12B are arranged adjacent one another on this axis (i.e. the pointing axis P passes through both scintillation bodies). An opaque sheet, for example a metallic foil, is arranged at the interface between the adjacent faces of the respective scintillation bodies 12A, 12B. This is to optically isolated the respective scintillation bodies from one another to prevent scintillation light generated in a gamma-ray interaction in one of the scintillation bodies from coupling into the other scintillation body. The exposed faces of the scintillation bodies may in accordance with generally conventional techniques be enclosed in an opaque housing with a reflective inner surface to promote transfer of scintillation light to the respective photodetectors while block external light from the respective photodetectors.

The scintillation bodies 12A, 12B in this example are generally cuboid in shape with a longitudinal axis aligned with the pointing axis P. The extent of the scintillation bodies along the pointing axis P is greater than their extent in directions perpendicular to the pointing axis P, for example by a factor of at least two, three, four or five. The scintillation bodies may be relatively large, for example on the order of 400 mm×100 mm×100 mm, or maybe smaller, for example on the order of 50 mm×15 mm×15 mm. The particular size for any given implementation will depend on the application at hand, for example whether or not the detector 1 is primarily intended for static use or as a user-carried portable device. It will be appreciated the specific shapes of the scintillation bodies may also be different in different implementations. For example generally cylindrical scintillation bodies could also be used.

The photodetectors in this example comprise photomultiplier tubes optically coupled to the respective scintillation bodies using conventional techniques. However, in other embodiments, other photodetector technologies may be used. For example, other embodiments may employ solid state photodetectors.

Thus, and as is conventional, gamma-ray interactions within the respective scintillation bodies 12A, 12B give rise to scintillation photons which are detected by the respective photodetectors 14A, 14B. Output signals from the photodetectors 14A, 14B are coupled to processing circuitry 16 in the controller element 4 of the detector 1.

The gamma-ray detector element has a centre C on the pointing axis in the region where the two scintillation bodies are adjacent one another. As discussed further below, a significant aspect of the operation of the detector of FIG. 1 is the orientation of the pointing axis P relative to a reference direction O. This may be represented in terms of an azimuthal angle θ between the pointing direction and the reference direction, for example as schematically indicated by the polar coordinate system shown to the top-left of FIG. 1. It will be appreciated this schematic representation of the coordinate system in the top left of FIG. 1 shows the pointing axis P in an arbitrary direction away from the reference direction O, which in this example is pointing horizontally from left to right, and does not represent the specific orientation of the detector 1 shown in FIG. 1. It is assumed the detector 1 in this example embodiment is for establishing a direction to a source of gamma-rays within a horizontal plane corresponding to the plane of the figure (i.e. the plane containing the reference direction O and the pointing direction P is taken to be a horizontal plane for all θ).

The processing circuitry 16 is configured to receive the signals from the respective photodetectors and process them to establish count rates for gamma-ray interactions within the respective scintillation bodies and to generate energy loss spectra for the gamma-ray interactions in accordance with generally conventional scintillation-detector processing techniques. The processing circuitry 16 is configured to perform further processing of the output signals from the photodetectors 14A, 14B in order to establish a direction to a source of gamma-rays as described further below. The processing circuitry may be specific to the detector, or may be provided by a suitably programmed general purpose computer, for example, a personal data assistant (PDA) type device, coupled to the detector.

The detector is also provided with a display screen 18, for example a liquid crystal display (LCD) screen for displaying information to a user. In embodiments where the processing circuitry is provided by a general purpose computer, the display screen may also be a part of the general purpose computer.

The detector 1 further comprises an orientation sensor 20 for measuring the orientation of the pointing axis P of the detector relative to the reference direction O. This may be based on any conventional technologies, for example by sensing the Earth's magnetic/gravitational fields, or by sensing movement using (solid state) gyroscope technologies. In some cases the reference direction O may be an absolute fixed direction in space (for example a horizontal direction to magnetic north) while in other examples the reference direction O may be redefined for each use of the detector, for example reference direction O may correspond to whichever direction the detector is first pointing when a measurement is initiated, such as described further below.

The above-mentioned elements of the detector 1 may be mounted in an aluminium housing. For implementations where the detector is intended for handheld operation, the housing may be provided with a handle. In other examples, larger versions of this detection system could be mounted, for example, on the roof a vehicle.

Thus, the detector 1 represented in FIG. 1 is operable to in effect make an independent measurement of gamma-ray intensity/count rate for gamma-ray interactions in each of the first and second scintillation bodies 12A, 12B. The relative intensities for gamma-ray interactions in each of the scintillation bodies associated with a source of gamma-rays will depend on the location of the source of gamma-rays relative to the pointing axis P. For example, if a source of gamma-rays is in line with the pointing axis P there will be an increased rate of gamma-ray interaction in whichever scintillation body is on the side of the detector closest to the source of gamma-rays. This is because the scintillation body nearest to the source of gamma-rays will attenuate/shield the gamma-rays for the other scintillation body. If, however, the source of gamma-rays is off to one side of the detector, for example along a line passing through the centre C of the detector and perpendicular to the pointing axis P, the intensities of gamma-ray interactions associated with each of the first and second scintillation bodies will be comparable. In effect, the relative gamma-ray intensities measured by respective ones of the gamma-ray scintillation detectors 10A, 10B will vary in dependence on the direction to the source of the gamma-rays as one scintillation body shields the other by an amount which depends on the offset between the pointing direction and the direction to the source of gamma-rays. Thus, the inventors have recognised that an estimate of the direction to the source of radiation can be determined by observing the relative count rates associated with the two gamma-ray scintillation detectors 10A, 10B as the detector 1 is moved to point in different directions.

In particular, a signal parameter, SP, may be established from the relative gamma-ray intensities seen by the first and second scintillation detectors 10A, 10B for different orientations of the pointing axis P. Furthermore, the expected variation of this signal parameter with changing angular offset between a direction to a source of gamma-rays and the pointing axis P may be established (either through theory, measurement or modelling, for example Monte Carlo simulation modelling). This variation may be referred to as a transfer function, TF, for the detector. In this example embodiment it is assumed the signal parameter is defined to be the difference in gamma-ray intensities seen by the two gamma-ray scintillation detectors 10A, 10B divided by the sum of the gamma-ray intensities seen by the two gamma-ray scintillation detectors 10A, 10B. That is to say:

$$TF=[A(\theta)-B(\theta)]/[A(\theta)+B(\theta)] \quad \text{(Equation 1)}$$

where $A(\theta)$ is the gamma-ray intensity associated with detector A for an azimuthal angle $\theta$ between the pointing axis of the detector and the source of gamma-rays and $B(\theta)$ is the gamma-ray intensity associated with detector B for an azimuthal angle $\theta$ between the pointing axis of the detector and the source of gamma-rays.

The gamma-ray intensities associated with the output signals from the respective photodetectors 14A, 14B may be established in accordance with conventional techniques for processing gamma-ray scintillation detector measurements. For example, the gamma-ray intensities may be based on the observed count rates for gamma-ray interaction events. In some examples, different intensities $I_A(\theta)$, $I_B(\theta)$ may be established for different gamma-ray energy bands in energy loss spectra determined from the signals from the respective photodetectors. As explained further below, this can be helpful because the transfer function might depend on the energy of gamma-rays from the source (because the degree to which the respective scintillation bodies attenuate gamma-rays will generally be energy dependent). However, in this example implementation it is assumed for simplicity the transfer function is established based on the count rate seen for all gamma-ray interactions (i.e. irrespective of energy).

Figure 2:
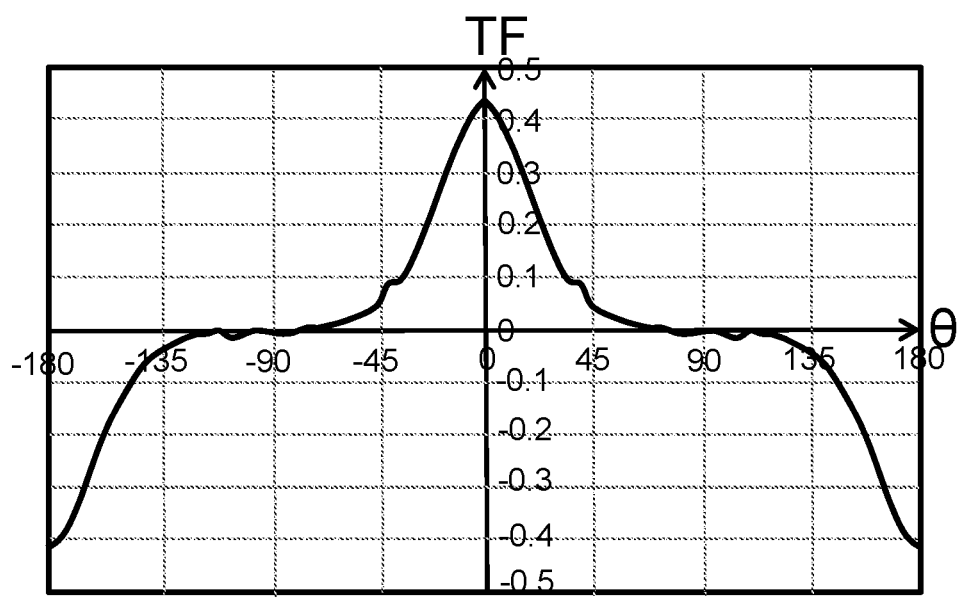
FIG. 2 is a graph schematically presenting a transfer function for the detector represented in FIG. 1 which indicates an expected variation in relative signal levels for different orientations of the detector relative to a source of gamma-rays.

FIG. 2 is a graph schematically presenting a transfer function TF for the detector 1 represented in FIG. 1. The curve plotted in FIG. 2 represents the parameter $[A(\theta)-B(\theta)]/[A(\theta)+B(\theta)]$ defined by Equation 1 above. As is to be expected, when the angular offset $\theta$ between the pointing axis P of the detector 1 and the source of gamma-rays is 0°, there is a higher intensity of gamma-rays seen with the first gamma-ray scintillation detector 10A as compared to the second gamma-ray scintillation detector 10B (because the first gamma-ray scintillation detectors shielding the second gamma-ray scintillation detector). This is apparent from a peak in the transfer function for this pointing direction. Conversely, when the detector is pointing at $\theta=180°$ (pointing axis P pointing directly away from the source of gamma-rays) there is a corresponding negative peak in the transfer function. When the source of gamma-rays is approximately "side on" to the pointing axis (i.e. for angular offsets of) +/−90° the gamma-ray count rates in each detector are broadly similar and so the transfer function is around zero.

In accordance with embodiments of the invention, the controller element 4 of the detector 1 further comprises a memory 22 in which a representation of the transfer function established for the detector is stored. This may be stored, for example, in terms of a defined functional form or in terms of a lookup table of values. As described further below, this pre-established model for the transfer function may be used in accordance with embodiments of the invention to determine a direction to a source of radiation by observing how the output signals associated with the two photodetectors 14A, 14B change as the pointing axis for the detector 1 is moved among a plurality of different orientations.

Figure 3:
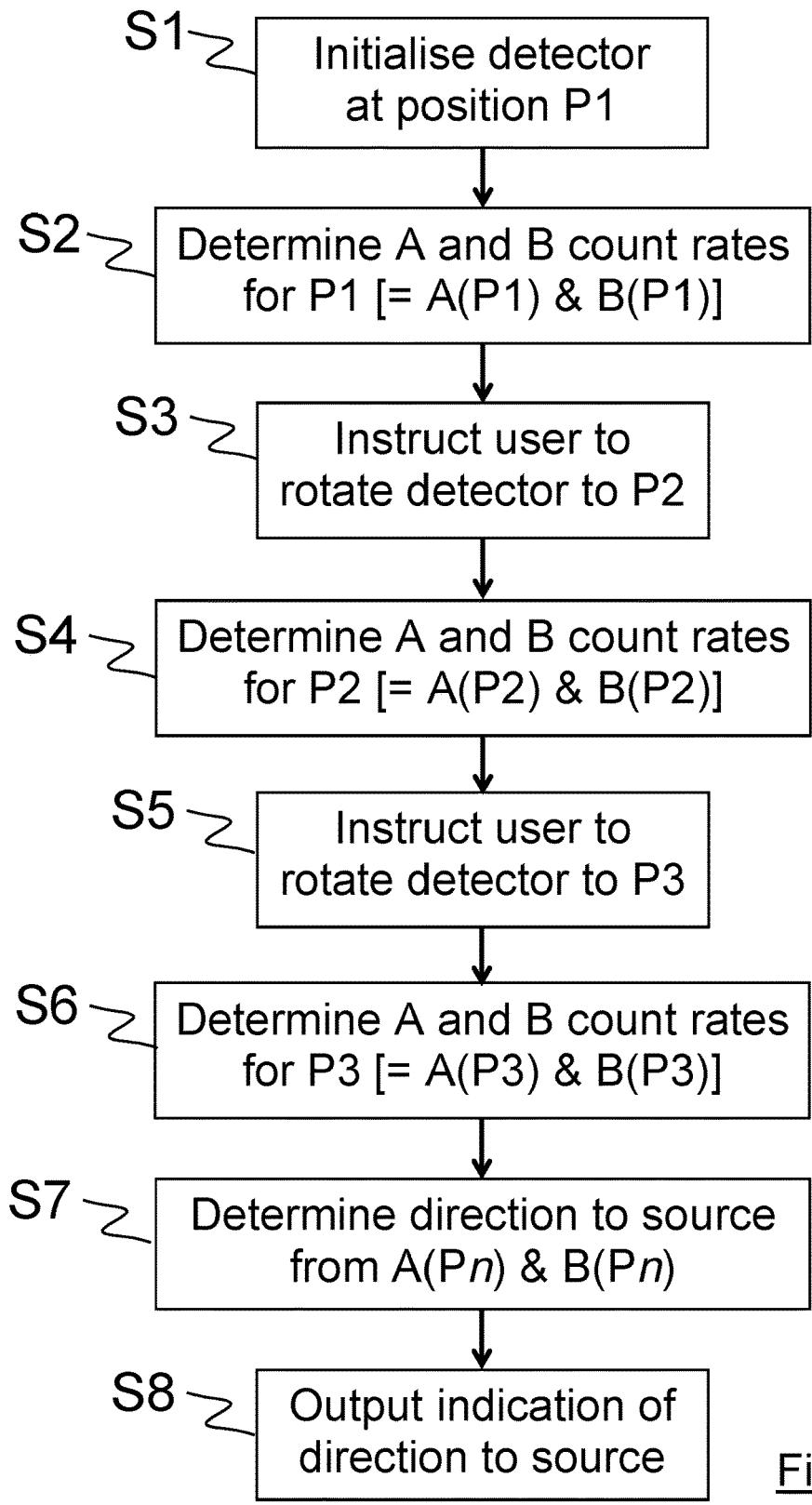
FIG. 3 is a flow diagram schematically representing a method for determining a direction to a source of gamma-rays according to an embodiment of the invention.

A method for determining the direction to a source of gamma-rays using the detector 1 of FIG. 1 is schematically represented in the flow diagram of FIG. 3. Here it is assumed the detector is for measuring the direction to a source of gamma-rays within a horizontal plane. For example, a user may be holding the detector in an environment to search for sources of gamma-rays at ground level, for example, at a border control to search for illicit sources of radiation in cargo. The user may wander around an area to be searched until the detector indicates it is receiving a level of gamma-rays above a pre-defined threshold corresponding to a level of gamma radiation which is considered to be worthy of further investigation for the implementation at hand. For example, the detector may continue to monitor the level of gamma radiation in the environment based on the summed responses from the two gamma-ray scintillation detectors 10A, 10B and provide an audible and/or visible indication to a user when the level of gamma radiation exceeds the threshold for further investigation. This may then trigger the user to initiate the process of determining a location to the source of gamma radiation which has raised the trigger.

In a first step S1 the user initialises the detector with the pointing axis aligned in a first direction P1. In this example P1 is taken to define a reference direction for the measurement and may simply correspond with the direction in which the detector is first pointing when the user initialises the detector to make the measurement, for example by pressing a "start measurement" button.

In a second step S2 the user continues to hold the detector 1 so that its pointing axis remains oriented along direction P1 while the detector establishes a first gamma-ray event count rate A(P1) for the first gamma-ray scintillation detector 10A (detector A) and a second gamma-ray event count rate B(P1) for the second gamma-ray scintillation detector 10B (detector B). These gamma-ray event count rate may be determined in accordance with conventional techniques. For example, data may be collected for a sufficient period (integration time) to allow a given number of events to be observed in accordance with a desired statistical accuracy. During the integration period the display 18 of the detector 1 may be configured to indicate to a user that he should keep the detector pointed in its current position.

Figure 4A:
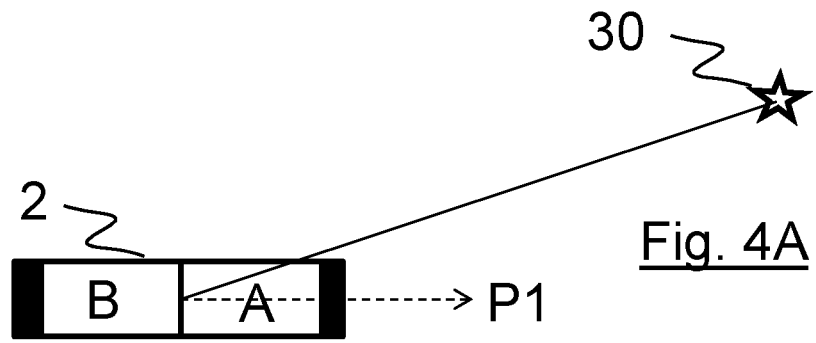
FIGS. 4A to 4C schematically represent different orientations of the detector of FIG. 1 relative to a source of gamma-rays at different stages of the method represented in FIG. 3.

FIG. 4A schematically represents the orientation of the detector 1 during steps S1 and S2 relative to the source 30 of gamma-rays whose direction is being measured (although at this stage of the processing of FIG. 3 the direction to the source 30 is not yet determined). Here it is assumed that the initial pointing direction P1 which defines a reference direction O for the measurement is horizontal from left to right for the orientation shown in the figure. Because in this example the initial direction of the detector (i.e. P1) is taken to define the reference direction for the measurement, P1 is by definition at an angle of 0° relative to the reference direction. It is assumed for this example the (as yet unknown) direction to the source 30 of gamma-rays is at an angle of approximately −30° relative to the reference direction O/initial pointing direction P1. For this configuration it can be expected the intensity of gamma radiation seen by detector A will be greater than that seen by detector B because the scintillation body of detector A is (at least partially) shielding the scintillation body of detector B from the source of gamma radiation.

Once the detector has established gamma-ray count rates A(P1) and B(P1), processing moves to step S3.

Figure 4B:
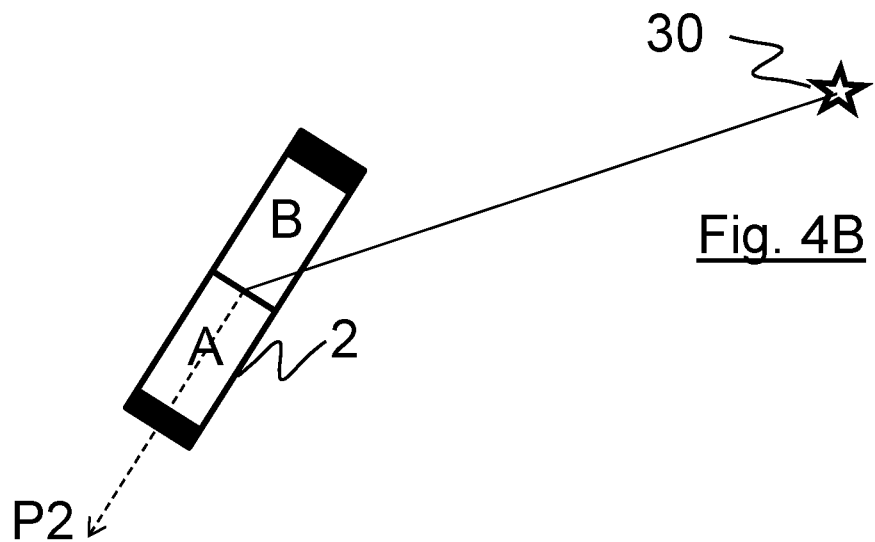

In step S3 the detector provides an indication to instruct the user to reorient the detector so that its pointing axis is aligned with a new direction P2. In this example it is assumed the detector is configured to make measurements for three different pointing directions arranged around a full rotation of the detector, and as such the new direction P2 corresponds with the pointing axis of the detector being rotated to an azimuthal offset of 120° from the reference direction, as schematically represented in FIG. 4B. In this example it is assumed the display 18 provides a visual indication to the user when it is time to move the detector to the new pointing direction (i.e. after sufficient output signal integration in position P1 as determined in accordance with conventional gamma-ray scintillation measurement techniques), and furthermore provides an indication of when the user has correctly oriented the detector. For example, the display may comprise a compass-like representation based on information received from the orientation sensor 20. Various techniques may be used to assist the user, for example the device may beep or the display may change colour when the correct orientation has been obtained. In some examples the detector may need only be roughly oriented with the instructed position and the orientation sensor may then determine the actual pointing direction P2 used. For example, the user may be instructed to rotate the detector so that P2 is intended to be 120°, but if the user moves the detector to point at a direction corresponding to P2=110°, this may be taken to be sufficiently close to 120° that processing can continue as represented in FIG. 3 with P2=110°.

Thus, in step S4 (which is similar to step S2 but performed for the new pointing direction P2) the user continues to hold the detector 1 so that its pointing axis remains oriented along direction P2 while the detector establishes a gamma-ray event count rate A(P2) for the first gamma-ray scintillation detector 10A (detector A) and a gamma-ray event count rate B(P2) for the second gamma-ray scintillation detector 10B (detector B).

As noted above, FIG. 4B schematically represents the orientation of the detector 1 during step S4 relative to the source 30 of gamma-rays whose direction is being measured. The pointing direction P2 is at an angle of 120° relative to the reference direction O. For this configuration it can be expected the intensity of gamma radiation seen by detector B will be greater than that seen by detector A because now the scintillation body of detector B is (at least partially) shielding the scintillation body of detector A from the source of gamma radiation.

Once the detector has established gamma-ray count rates A(P2) and B(P2), processing moves to step S5.

Figure 4C:
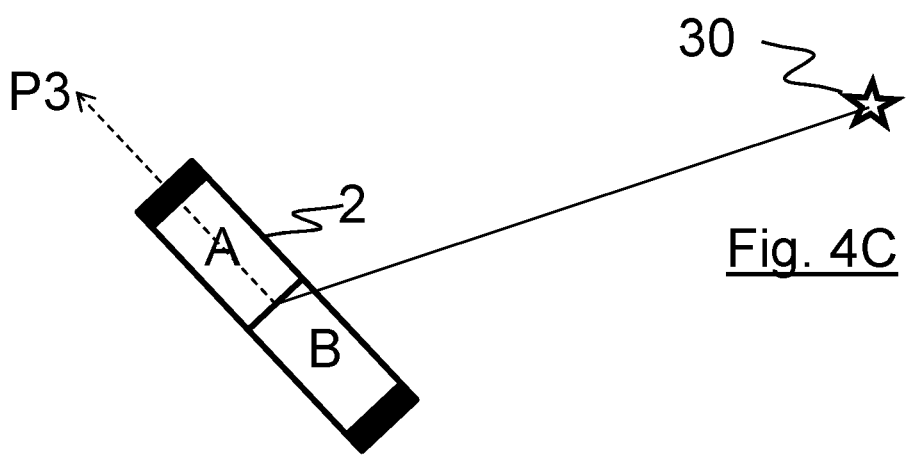

In step S5 the detector provides an indication to instruct the user to reorient the detector so that its pointing axis is aligned with a new direction P3. Thus, step S5 is similar to step S3, although it is associated with a different pointing direction. As noted above, it is assumed for this example the detector is configured to make measurements for three different pointing directions arranged around a full rotation of the detector, and as such the new direction P3 corresponds with the pointing axis of the detector being rotated to an azimuthal offset of −120° (equivalent to)+240° from the reference direction O, as schematically represented in FIG. 4C.

In step S6 (which is similar to steps S2 and S4 but performed for the new pointing direction P3) the user continues to hold the detector 1 so that its pointing axis remains oriented along direction P3 while the detector establishes a count rate A(P3) for detector A and a count rate B(P3) for detector B.

As noted above, FIG. 4C schematically represents the orientation of the detector 1 during step S6 relative to the source 30 of gamma-rays whose direction is being measured. The pointing direction P3 is at an angle of −120° relative to the reference direction O. For this configuration it can be expected the intensity of gamma radiation seen by detector A will again be greater than that seen by detector B because the scintillation body of detector A is, as for pointing direction P1 (=0°), partially shielding the scintillation body of detector B from the source of gamma radiation.

In step S7 the processing circuitry 16 is configured to determine a direction to the source from the six count rates that have been recorded (i.e. two count rates for each of three orientations, namely A(P1), B(P1), A(P2), B(P2), A(P3) and B(P3)).

To do this the processing circuitry 16 in this example first forms a signal parameter, SP(Pn), for each orientation P1, P2, P3 (i.e. n=1, 2, 3) comprising an indication of the relative count rates associated with the A and B detectors for each position in accordance with the formula of Equation 1 used to define the transfer function discussed above, i.e.:

$$SP(P1)=[A(P1)-B(P1)]/[A(P1)+B(P1)]$$

$$SP(P2)=[A(P2)-B(P2)]/[A(P2)+B(P2)]$$

$$SP(P3)=[A(P3)-B(P3)]/[A(P3)+B(P3)].$$

Figure 5:
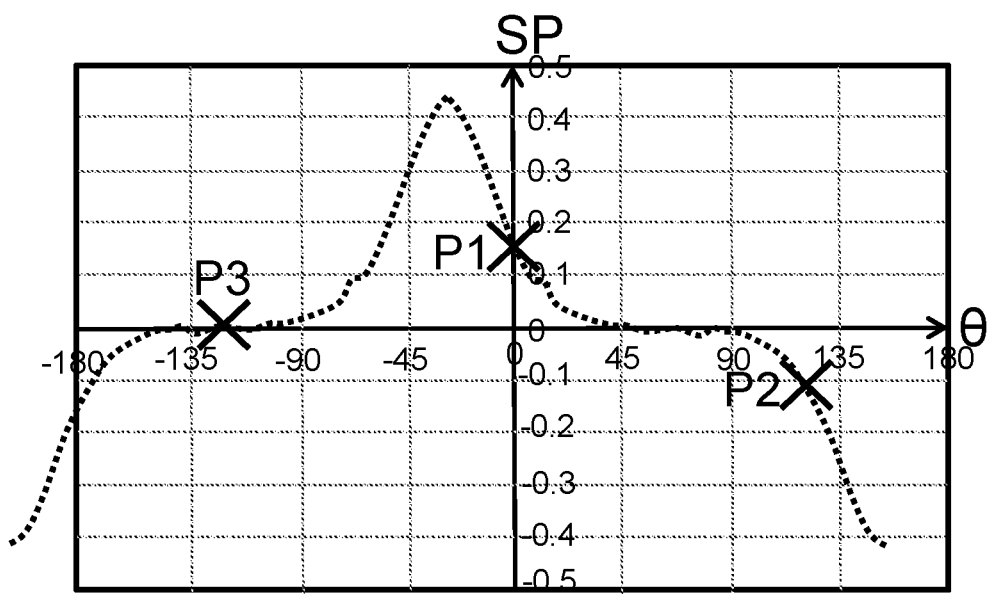
FIG. 5 schematically represents a process of fitting the transfer function of FIG. 2 to measurements obtained using the method of FIG. 3 to determine the direction to a source of gamma-rays in accordance with an embodiment of the invention.

Having established the signal parameter for each orientation, the processing circuitry is configured to fit the pre-defined transfer function for the detector as representing in FIG. 2, to the three measurements SP(P1), SP(P2), SP(P3). This is schematically represented in FIG. 5 which plots the signal parameter established for each orientation of the detector as a function of angular offset θ from the reference direction O (i.e. P1=0°, P2=120°, the P3=−120°). The respective measurements of the signal parameter SP are corresponding labelled P1, P2 and P3. Also presented in FIG. 5 in dotted line is the determined best fit of the pre-determined transfer function TF for the detector represented in FIG. 2 to the three measurements SP(P1), SP(P2), SP(P3). This fitting may be performed using conventional fitting techniques. In some embodiments an error estimate may be established for each measurement of the signal parameter, for example based on standard statistical analysis techniques, and this may be taken into account during the fitting process, again in accordance with standard statistical techniques.

Having fitted the transfer function TF of the detector to the three measurements representing the relative count rates from the A and B detectors for the respective orientations, the direction to the source of gamma-rays relative to the reference direction O (i.e. relative to the direction θ=0°) is determined from the location of the peak in the fitted transfer function (i.e. the peak in the dotted line of FIG. 5). As can be seen in FIG. 5, and as is to be expected from the location of the source represented in FIGS. 4A, 4B and 4C, the location of the gamma-ray source 30 is determined to be at an offset from the reference direction O of around $\theta=-30°$. An error estimate (confidence measure) for the fit can be established in accordance with conventional statistical processing techniques, for example based on deviations between the fitted transfer function curve and the measurements derived from the relative count rates/intensities associated with the two gamma-ray scintillation detectors comprising the detector, potentially with weightings according to individual error estimates for each signal parameter measurement.

In step S8 of the processing represented in FIG. 3 the user is provided with an indication of the determined direction to the source (and potentially any associated error/confidence estimate), for example through the display of an arrow on the display screen. The orientation of the arrow on the display may be changed in response to changes in orientation of the detector sensed by its orientation sensors so that it continues to point in the determined source direction even as the detector is moved.

Thus, in accordance with the principles described above, a detector is provided which a user may simply rotate to a number of orientations whilst gamma-ray count rates are measured using first and second gamma-ray scintillation detectors arranged with their scintillation bodies arranged adjacent one another on an axis of the detector, and a direction to a source of gamma-rays in the environments may be established from an analysis of the various measured count rates.

As will be appreciated, there are many variations and modifications that may be adopted in accordance with other example embodiments of the invention.

For example, in some cases the detector may be configured such that measurements are taken for more than three locations, although in principle three directions may be sufficient to uniquely determine a direction to a source. With more than three measurements a higher degree of confidence in the determined direction they be established in accordance with conventional statistical techniques. Furthermore, with a larger number of measurements, a superposition of potentially more than one transfer function curve may be fitted to the data, thereby allowing the direction to more than one source of gamma-rays to be determined.

In some other examples the detector may not comprise a sensor for determining its own angular orientation. In such cases a user may simply rely on other information to orient the detector to the desired pointing direction. For example, the detector may simply be rotated relative to a frame comprising markers for different directions, or the user may simply use a separate orientation device, for example a stand-alone compass.

In some other examples the detector may not instruct the user to obtain measurements for any particular orientations. Rather the user may simply point the detector in a series of arbitrarily selected orientations and initiate gamma-ray count rate measurements at each orientation. The detector may be configured for each orientation to measure the orientation and use this value for the fitting process represented in FIG. 5.

Furthermore, whilst the above-description has focused on an embodiment of the invention in which a detector is generally a portable detector that a user may hold and point. In other examples, for example for more sensitive (larger volume) detectors, the detector may be mounted to a frame, such as a vehicle, and rotated relative to the frame. In such cases the detector may comprise a drive mechanism to automatically move the detector to the desired orientations for taking measurements. Thus, the process may be entirely automated. For example, a driver of a vehicle may stop in a desired location and initiate a measurement with a single button press. Indeed, in principle, the detector could also work for a moving vehicle, particularly if the source is sufficiently far away relative to the distance traveled by the vehicle during the time required to make a direction measurement.

Thus a vehicle mounted system based on the use of relatively large Caesium iodide or sodium iodide detectors (e.g. 100 mm×100 mm×400 mm) could be one example application of the techniques described herein. The scintillation detectors could in this case be mounted on a rotating table located for example on the roof of a small van or a car. This system could patrol a road with the detectors stationary until a significant increase in the background gamma-ray flux is observed. The vehicle could then stop and attempt to determine a direction to a gamma-ray source giving rise to the increasing background gamma-ray flux. There could be some additional benefit (for this and other implementations such as the primarily hand-held implementations described above) from using a second pair of scintillation detectors placed alongside of the first pair. This would have the effect of in effect reducing the level of background since each detector would partially shield its neighbor. Alternatively a lead shield on one side of the scintillation detectors and, potentially also above and/or below, could similarly reduce the level of the natural background radiation from the environment.

In another implementation a detector in accordance with an embodiment of the invention might comprise a wearable detector, for example with the two detection crystals each having dimensions on the order of 15 mm×15 mm×50 mm (a sensitive volume of tens of cubic centimeters). The detector may use silicon photodiode photodetectors instead of vacuum photodiode photodetectors, for example, with a view to making the detector more compact. Such an instrument could be worn/carried by personnel such as police officers or border guards and coast guards for searching buildings, vehicles or vessels. The detector may be worn with its pointing axis generally horizontal such that rotation of the detector to the different orientations desired can be established by the user simply turning on the spot. It may be expected the direction-finding capability of such an instrument might significantly reduce the time taken to search a room to locate a source of gamma-rays that has been detected.

It will be appreciated that in addition to using the gamma-ray interaction measurements for the process of establishing a direction to the source of radiation, an intensity for the source of radiation may also be established from the measurements, for example based on a sum of the count rates for the various scintillation detectors and/or orientations. Furthermore, energy loss spectra for the measured events may be generated in accordance with conventional gamma-ray scintillation signal processing techniques for the purposes of aiding isotope-identification. In some cases gamma-ray intensity/spectral information may be established from the same measurements used to determine the direction to the source. In other cases, the user may approach the source once its direction is established to increase count rates, and measurements taken at this stage may be used for intensity measurement/isotope identification purposes.

In order to improve accuracy for isotope identification, the respective gamma-ray scintillation detectors may be gain stabilised so that observed pulse heights associated with individual gamma-ray interactions consistently reflect an indication of the gamma-ray energy deposited in the associated interaction event. This can be helpful because the gain of the photodetectors may in some cases be temperature-dependant, as may be the light output of the scintillation bodies for a given energy deposit. Therefore, in some cases an initial calibration of the respective gamma-ray scintillation detectors comprising a detector in accordance with certain embodiments of the invention might not remain accurate if there is a temperature change without compensatory changes in gain being made. In accordance with conventional gain-stabilisation techniques this may be achieved using reference gamma-ray interaction events associated with the detection of gamma-rays of known energy, thereby allowing the known spectral features of these gamma-rays to be relied on to track changes in response that can be compensated for with appropriate gain changes, for example adjusting a bias voltage for a PMT.

Detectors in accordance with embodiments of the invention may thus comprise a calibration source in the form of a positron-emitting radioactive material, such as Na22. The radioactive material may be positioned at the interface between the two scintillation bodies comprising the two gamma-ray scintillation detectors of a detector in accordance with embodiments of the invention. For example a calibration source may be provided in the vicinity of the point labelled C in the example of FIG. 1. When a positron is emitted from the radioactive material comprising the calibration source it will annihilate within a short distance and leads to the generation of a pair of co-linear 511 keV gamma-rays.

The geometry of the arrangement described above is such that one each of the 511 keV positron-annihilation gamma-rays will generally enter one each of the first and second scintillation bodies associated with the two gamma-ray scintillation detectors comprising the detector and so give rise to simultaneous gamma-ray detection events the two gamma-ray scintillation detectors comprising the overall detector. Conventional coincidence detection techniques may be employed to identify when simultaneous gamma-ray interactions occur in the first and second scintillation bodies. Events identified as being in coincidence may then be assumed to be related to the two 511 keV annihilation photons. If the spectra from these two coincident energy deposits are recorded separately in two MCAs, the knowledge of the positions of the two full-energy peaks can be used to adjust the gain of the respective gamma ray scintillation detectors A and B. There may be other criteria to be met before a coincidence event is deemed a calibration event. For example, there may be a requirement for the initially determined energy deposits for both the coincidence events to be within predetermined threshold amount of the "correct" 511 keV energy deposit. This could help remove events which are clearly not associated with positron-annihilation gamma-rays associated with the calibration source, or events in which a positron-annihilation gamma-ray from the calibration source does not deposit all its energy in the scintillation body (and hence should not be relied on for calibration). Other types of calibration scheme could equally be used, for based around the principles described in co-pending UK patent application number GB 1213374.0 [5].

The above description has primarily focused on embodiments of the invention used for determining the direction to a source of radiation within a two-dimensional plane, for example a horizontal plane. This may be a common application, for example where a user is looking for sources at ground level. However, in principle the same techniques can be extended to identify the direction to a source in three dimensions. This can be achieved, for example, by taking measurements as described above with reference to FIG. 3, but with the various pointing directions used to obtain measurements spanning three dimensions. For example, a user may first take measurements in accordance with the method represented in FIG. 3 within a horizontal plane, and then, once the direction to the source has been established within the horizontal plane, may align the pointing axis of the detector with this direction and take corresponding measurements with the detector being pointed in different directions in a vertical plane to establish a direction to the source of radiation in the vertical plane. Furthermore, rather than this two-stage approach, in another example a user may simply align the detector for obtaining measurements in a plurality of horizontal and vertical directions with the observed measurements being then fitted to a three-dimensional transfer function following the same principles as described above for a two-dimensional transfer function. As will be appreciated, the three-dimensional transfer function may be a true three-dimensional function, or may comprise two orthogonal two-dimensional transfer functions.

It will furthermore be appreciated that even if the detector is rotated in a single plane, for example a horizontal plane, information regarding a direction to the source outside the horizontal plane may be determined from the amplitude variation for the best-fit transfer function. This is because a source that is exactly in the plane in which the detector is rotated will give rise to a greater "modulation" effect as the detector is rotated than a source which is outside this plane (because the degree of mutual shielding depends on how far the source is from the plane of rotation).

As already noted above, the transfer function for a detector may depend on the energy of incident gamma-rays (because of differences in their attenuation in the respective scintillation bodies). In some example embodiments this may be accounted for by establishing different transfer functions for different gamma-ray energies/energy ranges. For example, a modelled "low-energy" transfer function, perhaps for 60 keV gamma-rays, and a modelled "high-energy" transfer function, perhaps for 1500 keV, may be determined. Appropriate transfer functions for intermediate energies may then be determined using interpolation techniques. When gamma-rays from a source whose direction is to be determined are observed, their energies can be recorded in accordance with conventional scintillation detection techniques. The events can then be binned into different energy ranges and a direction to the source determined for each binned energy range using an appropriate transfer function for that energy. The different directions can then be combined to provide an overall estimate.

In situations where there may be relatively high levels of background radiation and a user wishes to detect specific sources associated with specific gamma-ray energies, a direction to a source of radiation may be established in accordance with the principles described above, but only taking account of gamma-ray detection events deemed to be associated with an energy in a band surrounding the energies associated with the sources. That is to say, events may be filtered for use in determining a direction to a source based on energy.

As noted above, the spectral information in energy loss spectra observe using the detector can be used to identify the nature of the source (e.g., by identifying features in the spectra which are characteristic of a given radioactive material). This can be done using conventional techniques, for example spectrum deconvolution such as described in WO 02/031536 [4]. The two energy loss spectra from the two camera scintillation detectors comprising the overall detector may be processed separately, or after summing. Summing can be useful if the overall count rates are low because summing can help to reduce the statistical noise. Summing will be most effective where the responses of each of the scintillation bodies are first normalised. Normalisation can help to ensure the summed energy loss spectrum is close to that which would be obtained from a spectrometer comprising a single scintillation body with a volume comparable to that of the two scintillation bodies together. This can help to optimise the ability to identify isotopes from the spectrum. However, some processing techniques, e.g. those described in WO 02/031536 [4], take account of the modelled responses of the individual scintillation bodies, and so in these cases it may be preferable for the spectral processing to be performed separately for each detector. This approach also allows gain-stabilisation and energy-calibration to be managed separately. Thus the spectral information can be used to identify the nature of the source of the radiation. Again, this information can be displayed to a user on a display screen.

As already noted above, it will be appreciated that although the above examples have focussed on hand held detectors, the principles are also applicable to other scales of detector, as also mentioned above. For example larger (and hence more sensitive) "back-pack" mounted detectors, or static detectors, employing the same principles may be employed.

Furthermore, it will be appreciated that any scintillation material, both organic and inorganic, may be used for the scintillation bodies. For example, in some implementations a cerium-doped $Gd_3A_{12}Ga_3O_{12}$ (Ce:GAGG) based scintillation body may be used. This can have some advantages in some cases as it has a relatively high density (hence stopping power) and is also a relatively bright and fast scintillator, which can both be especially advantageous when using silicon photomultiplier photo-detector. Different types of photo-detector may also be used in place of the PMTs employed in the examples described above. For example, avalanche photo-diodes, or silicon photomultipliers could equally be used.

Thus a gamma-ray detector for determining the direction to a source of gamma-rays is described. The detector comprises a first scintillation body coupled to a first photodetector and a second scintillation body coupled to a second photodetector, wherein the first scintillation body and the second scintillation body are arranged to be co-axial with a pointing axis of the detector. The detector further comprises a processing circuit arranged to receive output signals associated with the first and second photodetectors for a plurality of different orientations of the pointing axis of the detector relative to a reference direction. The processing circuit is further operable to determine a direction to the source of gamma-rays relative to the reference direction based on output signals associated with the first and second photodetectors for the plurality of different orientations of the pointing axis of the detector relative to the reference direction.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Larssen, C., L., & Djeffal, S., *Development of a Directional Gamma-ray Probe*, Nuclear Science Symposium Conference Record 2005, I12EEE, Volume 1, pages 16-18
[2] WO 2008/015382
[3] Wahl, C., & He, Z., '*Gamma-Ray Point-Source Detection in Unknown Background Using* 3*D-Position-Sensitive Semiconductor Detectors*' IEEE Trans Nucl. Sci. 58, 3 (2011), p 605-613.
[4] WO 2002/031536
[5] UK patent application number GB 1213374.0.

The invention claimed is:

1. A gamma-ray detector for determining the direction to a source of gamma-rays, the detector comprising:
    a first scintillation body coupled to a first photodetector and a second scintillation body coupled to a second photodetector, wherein the first scintillation body and the second scintillation body are arranged on a pointing axis of the detector; and
    a processing circuit arranged to receive output signals associated with the first and second photodetectors for a plurality of different orientations of the pointing axis of the detector relative to a reference direction, and wherein the processing circuit is operable to determining a direction to the source of gamma-rays relative to the reference direction based on the output signals associated with the first and second photodetectors for the plurality of different orientations of the pointing axis of the detector relative to the reference direction;
    wherein the processing circuit is operable to establish a signal parameter for each orientation of the pointing axis of the detector from the respective output signals associated with the first and second photodetectors for the respective orientations;
    wherein the processing circuit is operable to estimate energies for gamma-rays from the gamma-ray source based on the output signals associated with the photodetectors and wherein a predetermined model is determined by taking account of the estimated energies for gamma-rays from the gamma-ray source; and
    wherein the signal parameter established for each orientation of the pointing axis of the detector is based on a ratio of a difference in output signals associated with the first and second photodetectors to a sum of output signals associated with the first and second photodetectors.

2. A detector according to claim 1, wherein the processing circuit is operable to determine the direction to the source of gamma-rays relative to the reference direction by comparing the signal parameter for the plurality of different orientations of the pointing axis with the predetermined model of the variation of the signal parameter for different orientations of the pointing axis relative to a source of gamma-rays.

3. A detector according to claim 1, wherein the processing circuit is operable to take account of error estimates for the output signals associated with the different phototodetectors for the different orientations of the pointing axis of the detector when determining a direction to the source of gamma-rays.

4. A detector according to claim 1, further comprising a sensor for determining the orientation of the pointing the detector relative to the reference direction.

5. A detector according to claim 1, further comprising a drive mechanism configured to move the pointing axis of the detector, and wherein the processing circuit is operable to control the drive mechanism to sequentially move the pointing axis of the detector to the different orientations of the pointing axis of the detector relative to a reference direction to obtain the output signals from which the direction to the source of gamma-rays is to be determined.

6. A detector according to claim 1, further comprising an interface for providing instructions for a user of the detector to sequentially move the pointing axis of the detector to the different orientations of the pointing axis of the detector relative to a reference direction to obtain the output signals from which the direction to the source of gamma-rays is to be determined.

7. A detector according to claim 6, herein the processing circuit is further operable to provide an indication to the user when the pointing axis of the detector is at one of the different orientations of the pointing axis of the detector relative to a reference direction to obtain the output signals from which the direction to the source of gamma-rays is to be determined.

8. A detector according to claim 1 wherein the processing circuit is operable to estimate the energies for gamma-rays from the gamma-ray source based on the output signals associated with the photodetectors and wherein the direction to the source of the gamma-rays is determined in a manner that takes account of the estimated energies for gamma-rays from the gamma-ray source.

9. A detector according to claim 1, wherein the processing circuit is further operable to output an indication of the determined direction towards the source of gamma-rays.

10. A detector according to claim 1, wherein the plurality of different orientations of the pointing axis of the detector relative to the reference direction comprise three or more different orientations.

11. A detector according to claim 1, wherein the plurality of different orientations lie substantially in a two-dimensional plane with the direction to the source of gamma-rays being determined as a direction within the two-dimensional plane.

12. A detector according to claim 1, wherein the plurality of different orientations do not lie substantially in the same plane.

13. A detector according to claim 1, wherein the processing circuit is operable to provide an indication of the intensity of the gamma-ray source based on the magnitudes of the output signals.

14. A detector according to claim 1, wherein the processing circuit is operable to generate one or more energy loss spectra from the output signals.

15. A detector according to claim 14, wherein the processing circuit is operable to perform a spectral analysis of the one or more energy loss spectra, and to identify the nature of the source based on the spectral analysis.

16. A detector according to claim 1, wherein the first and second scintillation bodies are separated from one another by a layer of optically opaque material.

17. A gamma-ray detector for determining the direction to a source of gamma-rays, the detector comprising:
    a first scintillation body coupled to a first photodetector and a second scintillation body coupled to a second photodetector, wherein the first scintillation body and the second scintillation body are arranged on a pointing axis of the detector;
    a processing circuit arranged to receive output signals associated with the first and second photodetectors for a plurality of different orientations of the pointing axis of the detector relative to a reference direction, and wherein the processing circuit is operable to determining a direction to the source of gamma-rays relative to the reference direction based on the output signals associated with the first and second photodetectors for the plurality of different orientations of the pointing axis of the detector relative to the reference direction; and
    a calibration source comprising a radioactive material associated with the emission of positrons arranged between the first and second scintillation bodies, and wherein the processing circuit is configured to classify simultaneous output signals from the first and second photodetectors as being associated with 511 keV gamma-rays associated with the annihilation of a positron from the calibration source, and to adjust a gain associated with the respective photodetectors based on the respective output signals classified as being associated with 511 keV gamma-rays.

* * * * *